United States Patent
Sachs et al.

(10) Patent No.: US 9,665,072 B2
(45) Date of Patent: May 30, 2017

(54) METHOD FOR DETERMINING A SAFETY STEP AND SAFETY MANAGER

(75) Inventors: Jens Sachs, Petershagen (DE); Guido Beckmann, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 998 days.

(21) Appl. No.: 13/113,397

(22) Filed: May 23, 2011

(65) Prior Publication Data

US 2012/0022671 A1    Jan. 26, 2012

Related U.S. Application Data

(63) Continuation of application No. PCT/EP2009/065370, filed on Nov. 18, 2009.

(30) Foreign Application Priority Data

Nov. 24, 2008   (DE) .................. 10 2008 044 018

(51) Int. Cl.
    *G05B 9/02*   (2006.01)
(52) U.S. Cl.
    CPC ...... *G05B 9/02* (2013.01); *G05B 2219/24008* (2013.01); *G05B 2219/31461* (2013.01)
(58) Field of Classification Search
    CPC ............ G05B 2219/24008; G05B 2219/31461
    USPC .............................................. 700/79, 80, 21
    See application file for complete search history.

(56) References Cited

U.S. PATENT DOCUMENTS

| | | | |
|---|---|---|---|
| 2004/0044912 A1 | 3/2004 | Connary et al. | |
| 2005/0027374 A1 | 2/2005 | Van Dyk et al. | |
| 2005/0027379 A1* | 2/2005 | Dyk ................... | G05B 23/0283 700/79 |
| 2006/0129810 A1 | 6/2006 | Jeong et al. | |
| 2007/0198108 A1 | 8/2007 | Nair et al. | |
| 2007/0198222 A1* | 8/2007 | Schuster et al. .............. | 702/187 |
| 2009/0024230 A1* | 1/2009 | Hioka ................ | G05B 19/0426 700/17 |
| 2009/0235124 A1* | 9/2009 | Schmidt ......................... | 714/48 |

(Continued)

FOREIGN PATENT DOCUMENTS

| | | |
|---|---|---|
| CN | 1558608 A | 12/2004 |
| CN | 1802612 A | 7/2006 |

(Continued)

OTHER PUBLICATIONS

Jee et al., Control and Data Flow Testing on Function Block Diagrams 24th International Conference, SAFECOMP 2005 Proceedings, Sep. 2005, pp. 67-80.*

English translation of Japanese Office Action prepared by Japanese Patent Office in connection with Japanese Patent Application No. 2011-536848. Oct. 2, 2012. 4 pages.

Georg et al. "Using Aspects to Design a Secure System". Proceedings of the Eighth IEEE international Conference of Engineering of Complex Computer Systems. IEEE Computer Society. 2002. 10 pages.

(Continued)

*Primary Examiner* — Mohammad Ali
*Assistant Examiner* — Emilio J Saavedra
(74) *Attorney, Agent, or Firm* — Dorsey & Whitney LLP

(57) ABSTRACT

For determining a safety step in an automation network with subscribers the data and process-specific links between the subscribers in the automation network are automatically determined by means of a configuration-detecting module. Further the subscriber-specific safety parameters are determined. The safety step in the automation network is calculated by means of an algorithm which connects the determined data and process-specific links of the subscribers in the automation network and the determined subscriber-specific safety parameters.

15 Claims, 1 Drawing Sheet

(56) References Cited

U.S. PATENT DOCUMENTS

2010/0004761 A1* 1/2010 Flanders et al. ............. 700/28
2010/0125746 A1* 5/2010 Herrmann .......... G05B 19/4184
              714/1

FOREIGN PATENT DOCUMENTS

| CN | 101242629 A | 8/2008 |
|---|---|---|
| DE | 44 09 543 A1 | 10/1994 |
| DE | 103 18 837 A1 | 11/2004 |
| DE | 10 2004 020994 | 11/2005 |
| EP | 1 300 657 A2 | 4/2003 |
| EP | 1918794 A1 | 5/2008 |
| EP | 1980964 A1 | 10/2008 |
| JP | 2008-539622 | 11/2008 |
| WO | WO 2004/095716 A2 | 11/2004 |
| WO | WO 2006/067121 | 6/2006 |
| WO | WO 2006/067121 A1 | 6/2006 |
| WO | 2008096006 A1 | 8/2008 |
| WO | WO 2008/098515 A1 | 8/2008 |

OTHER PUBLICATIONS

Yi et al. "A Planar Attributes Model Based on Multi Level Security Policy" Chinese Journal of Computers vol. 27, No. 5, May 2004. 6 pages.

Search Report issued by the State Intellectual Property of China in connection with Chinese Patent Application No. 200980146897.6 on Nov. 1, 2012. 2 pages.

First Notification of Office Action issued by the State Intellectual Property of China in connection with Chinese Patent Application No. 200980146897.6 on Nov. 19, 2012. 13 pages.

International Search Report for International application No. PCT/EP2009/065370. Issued Mar. 18, 2010 for European Patent Office, Rijswijk, Netherlands. 3 pages.

Pitz GmbH Ostfildern "Wahrscheinlichkeitserkennung leicht gemacht" Service-Box des Online-Magazins CIC-web vol. Ausgabe AUT Jun. 2005 Jun. 1, 2005 (Jun. 1, 2005), XP002573656 Retrieved from the Internet: URL:http://www.cicweb.de/index.cfm?pid=147 3&pk=66042> retrieved on Mar. 16, 2010.

* cited by examiner

METHOD FOR DETERMINING A SAFETY STEP AND SAFETY MANAGER

CROSS-REFERENCE TO RELATED APPLICATION(S)

This application is a continuation of International Patent Application No. PCT/EP2009/065370, filed on No. 18, 2009, which claims priority to German Application No. 10 2008 044 018.3-31, filed on Nov. 24, 2008, the entire contents of both of which are incorporated herein by reference.

BACKGROUND

The present invention relates to a method for determining a safety step in an automation network comprising subscribers, as well as to a safety manager and to an automation network.

Modern concepts of industrial automation, i.e. controlling and monitoring technical processes by means of software, are based on the idea of a central control comprising a distributed sensor/actuator layer. Thereby, the subscribers communicate with one another and with superordinate systems via industrial local networks, in the following also referred to as automation networks. The automation networks are usually configured as what is known as master-slave communication networks in which the master subscriber represents the control layer and the slave subscribers represent the sensor/actuator layer.

Safety is an essential demand in industrial automation. When carrying out automation tasks, it has to be safeguarded that the automation network, upon failure of one of the subscribers or if other errors occur, will not pose any danger to humans and the environment. In order to be able to categorize the danger represented by an automation network, it is mandatory to have a danger assessment carried out. According to European standard EN1050, the risk assessment has to be carried out in a sequence of logical steps which allow for systematically examining danger emanating from the automation network and/or the individual subscribers. On the basis of the danger analysis, the technical and organizational demands to the automation network are then determined in order to ensure sufficient safety.

In this context, European standard EN 954-1 "Safety of machinery—Safety-related parts of control systems" has established itself as an International standard in the field of machine and plant safety for carrying out a danger analysis. The standard takes all safety-relevant subscribers regardless of their subscriber type into account, and categorizes their safety-related capacity. Based on the determined safety category, the control structure in the automation network is then configured in order to fulfil the demands to safety functions as well as to achieve a necessary system behaviour in the case of an error.

In order to be able to do particular justice to programmable electronic control systems with regard to safety demands, further standards have been introduced in addition to the EN 954-1 standard during the last few years. For danger analysis in automation networks, the EN ISO3849-1 and the IEC/EN 62061 standard are particularly relevant. By means of these two standards, a quantitative contemplation of safety functions is carried out in addition to the qualitative approach of the EN954-1 standard.

The EN ISO13849-1 and the IEC/EN 62061 standards specify the safety-relevant capacity of programmable electronic control systems required for risk reduction. In order to categorize the safety-relevant capacity, the two standards define safety steps. For this purpose, all safety functions of the automation network are considered together with all subscribers taking part in their execution.

The safety step of the automation network is determined on the basis of safety-relevant parameters of the subscribers participating in the safety functions. According to the EN 15013849-1 standard etc., these parameters are: mean time to failure (MTTF), diagnostic coverage (DC), probability of a dangerous failure per hour (PFH), time of use ($T_M$), number of cycles in which 10% of a sample of the wear-afflicted subscribers were found to be dangerous ($B_{10d}$), and common cause failure (CCF). Apart from the aforesaid safety-relevant parameters, further factors—even operational ones such as the requisition rate or the test rate of the safety function—may influence the safety step.

In order to determine the safety step of an automation network, exact information on the logic operation between the subscribers in the automation network is furthermore required apart from the knowledge of the safety-relevant parameters of all the subscribers participating in the safety function.

In order to be able to reliably categorize the danger posed by an automation network, complex calculations, e.g. by means of Markov analysis, are required. Moreover, the failure probability of individual subscribers has to be partially estimated due to insufficient data, which makes it difficult to give a definite statement. The determining of the safety step in the automation network thus poses considerable problems for small and medium-sized companies.

In the last few years, safety tools have increasingly hit the market, such as the safety calculator PAScal provided by the company Pilz, Ostfildern, Germany and the Safeexpert program provided by the company Sick, Weiskirch, Germany. These safety tools calculate the safety step of safety functions in automation networks depending on the used subscribers. Thereby, the subscriber-specific safety parameters are taken from a software library. However, in addition, the structure in the system, i.e. the data and process-specific link of the subscribers within the automation network, has to be entered individually. The safety tools verify the calculated safety step by means of the safety step required according to the EN ISO13849-1 and EN/EC62061 standards and show a potential need for action in order to improve the safety within the automation network.

The use of a software library for detecting the subscriber-specific safety parameters requires constant up-dating of this library in order to be able to take new subscribers into account during the safety calculation and/or in order to be able to consider modifications carried out in the subscribers. Moreover, the demand of individually entering the data and process-specific link between the subscribers in the automation network into the safety tool is time-consuming and error-prone. Thus, when determining the safety step, usually only a simplified contemplation of the control logic in the automation network is carried out. If the automation network is expanded or modified, it is additionally required to re-detect the modified structure in order to be able to determine the current safety step.

DE 103 18 837 A1 discloses a network in which data and process-specific links between the subscribers may be automatically detected by a safety manager.

EP 1 300 657 A2 and DE 44 09 543 A1 disclose networks in which subscriber-specific parameters may be determined automatically.

"Wahrscheinlichkeitsrechnung leicht gemacht" (Probability calculation made easy) from the service box of the CIC-web online magazine (online service of Henrich Publikationen GmbH), edition AUT June 2005, p. 1-3 (http://www.cicweb.de/index.cfm?pid=1473&pk=66042#)) shows a method for determining a safety step within an automation network comprising subscribers, in which the safety step in the automation network is calculated by means of an algorithm which connects the data and process-specific link between the subscribers in the automation network as well as the subscriber-specific safety parameters. This method has been realized in the "Safety Calculator PAScal" program by the company PILZ.

SUMMARY

The present invention generally relates to a method for determining the safety step in an automation network, a safety manager and an automation network which allow for an automatic calculation of the safety step in a simple and reliable manner.

One embodiment of the invention provides a method for determining a safety step in an automation network with subscribers. The method comprises automatically determining the data and process-specific links between the subscribers in the automation network by means of a configuration-detecting module. The method further comprises determining the subscriber-specific safety parameters. The method further comprises calculating the safety step in the automation network by means of an algorithm which connects the determined data and process-specific links of the subscribers in the automation network and the determined subscriber-specific safety parameters.

Another embodiment of the invention provides a safety manager for an automation network with subscribers. The safety manager comprises a configuration-detecting module for automatically detecting the data and process-specific links of the subscribers in the automation network from an automation network configuration. The safety manager further comprises a parameter-detecting module for detecting subscriber-specific safety parameters. The safety manager further comprises a calculation module for calculating the safety step of the automation network by means of an algorithm which connects the determined data and process-specific links of the subscribers in the automation network to the determined subscriber-specific safety parameters.

Another embodiment of the invention provides an automation network comprising a safety manager and subscribers. The safety manager comprises a configuration-detecting module for automatically detecting the data and process-specific links of the subscribers in the automation network from an automation network configuration. Each subscriber comprises a parameter memory in which assigned subscriber-specific safety parameters are stored, the subscribers being configured to transfer the safety parameters to the parameter-detecting module upon request.

DETAILED DESCRIPTION

Figure 1:
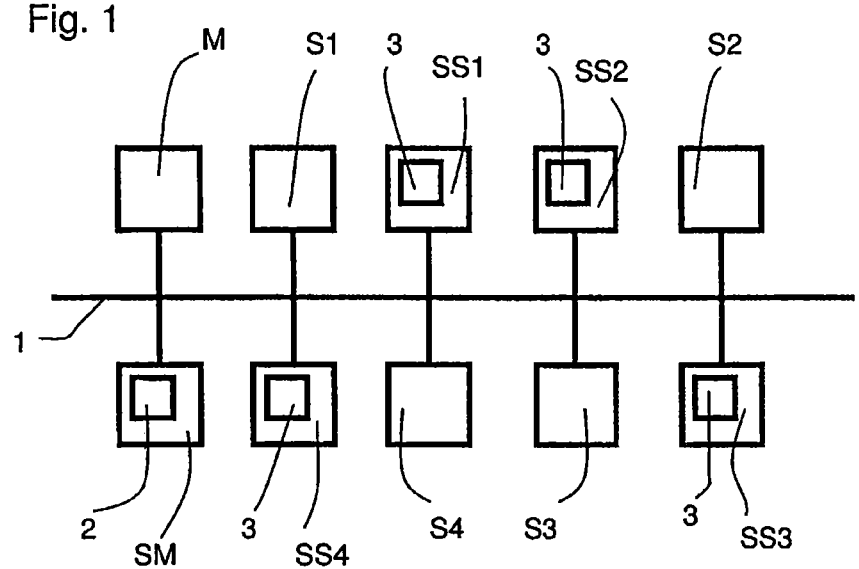
FIG. 1 schematically depicts an automation network comprising a safety area.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given automation device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any automation device.

Embodiments of the invention may generally be used with any type of automation system. In industrial automation, i.e. controlling and monitoring of technical processes by means of software on computers, decentralized control systems, in the following also referred to as automation networks, are increasingly used in which distributed devices arranged in a sensor/actuator layer, such as I/O modules, data loggers, valves communicate with the automation computers of a control layer via an efficient real-time-communication network. The subscribers in the automation network, i.e. the automation computers and/or the devices of the sensor/actuator layer, may be linked to one another via point-to-point connections or via a bus system. Thereby, a field-bus system is preferably used as a bus system.

Automation networks are usually configured hierarchically and operate according to the master-slave principle. The master subscribers are assigned to the control layer and are active subscribers having an authorization to access the communication links in the automation network and determine the data transfer. The slave subscribers belong to the sensor/actuator layer and are passive subscribers. They do not have an independent authorization to access the communication links, i.e. they may only acknowledge received data and transfer the data to a master subscriber upon request by the master subscriber.

FIG. 1 schematically shows the basic structure of an automation network. The automation network comprises two master subscribers M, SM forming the control layer, and eight slave subscribers $S_1$ to $S_4$, $SS_1$ to $SS_4$ representing the sensor/actuator layer. All subscribers in the automation network are connected to one another by means of a serial bus 1, via which the data exchange between the subscribers takes place. The data exchange between the subscribers is usually organized by the master subscribers M, SM in the form of data packets which consist of control data and user data, the control data in the data packet comprising an address information. The data exchange is then carried out e.g. on the basis of the Ethernet protocol which allows for data packets having a length of up to 1500 bytes at a transmission rate of 100 Mbit/sec.

It is an essential demand to the automation network to safeguard that in case of failure of a subscriber and/or in case of a functional error the automation network will not pose any danger to humans and the environment. Thereby, the degree of danger essentially depends upon the type and function of the subscriber in the automation network and the reliability of the control programs. In order to protect humans and/or the environment against danger, dangerous subscribers in the automation network may only be operated and maintained by using appropriate protective devices. Moreover, apart from the normal control functions, safety functions have to be carried out in the control layer of the automation network, ensuring that, if safety-relevant subscribers in the automation network fail, the automation network switches to a safe state. Such a safe state is e.g. an emergency switching-off of the automation network.

In order to be able to categorize the danger emanating from the subscribers of an automation network and/or the control program, it is mandatory to carry out a danger analysis. A plurality of standards exist comprising requirements and recommendations for design, integration and validation of safety-relevant automation networks. Thereby, the most frequently used standard is European standard EN 954-1 "Safety of machinery—Safety-related parts of control systems" which applies to all safety-related parts of controls regardless of the used form of energy and which comprises categories for classifying the respective necessary safety-related capacity. However, European standard EN 954-1 only provides a qualitative approach, whereby e.g. the failure probability of individual subscribers in the automation network is not taken into account.

Such a quantitative approach which allows for a reliable danger assessment, particularly of automation networks, is comprised in the more recent standards EN ISO 13849-1 and IEC/EN 62061. These standards define safety steps for categorizing differing safety-relevant capacities, the safety steps representing differing average probability values for a dangerous failure of the automation network per hour. In order to determine the safety step according to the EN ISO 13849-1 and IEC/EN 62061 standards, it is necessary to detect the subscriber-specific safety parameters. Such safety parameters of the subscribers are the mean time to failure ($MTTF_d$), the probability of a dangerous failure per hour (PFH), the diagnostic coverage ($DC_d$), the safe failure fraction ($SFF_d$), the time of use ($T_M$), the common cause failure (CCF) as well as other parameters specified in the standard.

Apart from the subscriber-specific safety parameters, it is further required for determining the safety step of the automation network to detect the data and process-specific link of the subscribers in the automation network. By means of the algorithms stipulated in the standards, the safety step may then be determined.

In general, not all subscribers in the automation network are safety-relevant. In addition, the number of safety functions in an automation network is usually lower than the number of non-safety-relevant control functions. For this reason, a safety area is usually defined within the automation network. In the automation network indicated in FIG. 1, the safety area is formed by the safety-relevant master subscriber SM, in the following also referred to as safety master SM, and the safety-relevant slave subscribers $SS_1$ to $SS_4$. The non-safety-relevant slave subscribers $S_1$ to $S_4$ further present in the automation network of FIG. 1 are controlled by the second master subscriber M, in the following also referred to as standard master M.

Instead of separating the safety functions from the non-safety-relevant control functions by providing separate master subscribers, as provided in the automation network depicted in FIG. 1, it is also possible to carry out the safety functions as well as the non-safety-relevant control functions on an individual master subscriber, whereby it has, however, to be guaranteed that the non-safety-relevant control functions will not affect the safety functions.

In case of the known safety tools by means of which the safety step in an automation network may be determined in accordance with the applicable standards, it is required to individually enter the data and process-specific link of the subscribers in order to carry out the safety functions in the automation network. Moreover, in the case of the known safety tools, the subscriber-specific safety parameters to be taken into account when calculating the safety step are taken from a software library. This makes it necessary to continuously update the software library in order to be able to take new safety-relevant subscribers into account and/or to detect modifications of the subscriber-specific safety parameters on the basis of technical or software-specific adjustments in the subscribers. The time and effort involved in the determination of the safety step in an automation network is considerably reduced by means of the safety manager 2 provided by the present invention.

In the automation network depicted in FIG. 1, the safety manager 2 is integrated in the safety master SM. In this context, the safety manager 2 may be configured as hardware or as software. As an alternative of the embodiment shown in FIG. 1, the safety manager 2 may be provided in any desired other subscriber of the automation network, e.g. in the standard master M. The safety manager 2 may, however, also be configured as an independent subscriber in the automation network.

Figure 2:
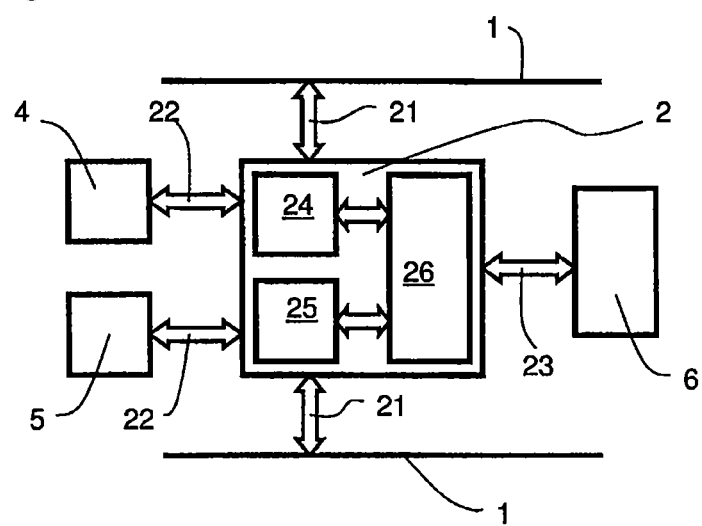
FIG. 2 shows a safety manager for an automation system.

The configuration of the safety manager 2 is schematically depicted in FIG. 2. The individual components of the safety manager may in turn be configured as hardware or as software. The safety manager 2 comprises three interfaces: a bus interface 21 for connecting the safety manager to the automation system, a data interface 22 and a man-machine interface 23. If the safety manager 2 is not an independent subscriber in the automation network but part of a master subscriber or of another subscriber in the network, the safety manager may alternatively use the corresponding interfaces of said host subscriber.

The safety manager 2 may import the automation-network configuration determined e.g. by a configuration tool 4 for executing an automation task via the data interface 22. In a configuration-detecting module 24 connected to the data interface 22, the imported system configuration is converted into a system model which detects the data and process-specific link of the safety-relevant subscriber in the automation network in a standardized form. Alternatively, however, the configuration-detecting module 24 may also detect the system model representing the data and process-specific links of the safety-relevant subscribers in the automation network independently in a test mode of the automation network. For this purpose, the configuration-detecting module 24 detects, e.g. by means of test data, the logic link of inputs and outputs of the safety-relevant subscribers while the automation task is executed. Furthermore, it is also possible that the configuration-detecting module 24 reads out the safety control from the safety master SM, detecting the data and process-specific linking of the safety-relevant subscriber therefrom.

The safety manager 2 further comprises a parameter-detecting module 25 for detecting the subscriber-specific safety parameters. These subscriber-specific safety parameters may be read in by the parameter-detecting module 25 via the data interface 22 from an external database 5 or be retrieved directly from the safety-relevant subscribers in the automation network via the bus interface 21. It is furthermore possible that the parameter-detecting module 25 restores the updated subscriber-specific safety parameters to the safety-relevant subscribers and/or external database 5.

As depicted in FIG. 1, each of the safety-relevant subscribers $SS_1$ to $SS_4$ comprises a parameter memory 3 in which the subscriber-specific safety parameters are stored. Said parameter memory 3 is write-protected and provided with an identifier. As an identifier, e.g. the checksum of the subscriber-specific parameters may be used. The identifier assigned to the individual parameter memories is furthermore stored in the parameter-detecting module 25. By means of these identifiers, a safe data communication between the parameter-detecting module 25 and the individual subscribers in the automation network may be carried out in order to exchange the subscriber-specific safety parameters.

In the safety manager 2, the configuration-detecting module 24 and the parameter-detecting module 25 are further connected to a calculation module 26 in order to calculate a safety step in the automation network. The calculation module 26 carries out the determining of the safety step by means of provided algorithms which take the provided safety standards into account. The algorithm to be used respectively may thereby be selected by the user via the man-machine interface 23 by means of a connected input/reproduction unit 6. However, it is also possible to automatically provide the algorithm to be used to the calculation module 26. The detected safety step, on the other hand, outputs the calculation module via the man-machine interface 23 in the form of a message to the input/reproduction unit 6.

In order to calculate the safety step in the automation network, the safety manager 2 may be operated in various modes. Thus, in a first operation mode, the safety manager 2 may be used within the framework of the system design in order to determine the respective safety step of the design in advance. In this context, the system configuration and the subscriber-specific safety parameters are retrieved from configuration tools 4 and/or the external database 5 via the data interface 22.

When operating the automation system, it is possible to re-calculate the safety step periodically or e.g. during initialization of the automation network in a second operating mode of the safety manager 2. In this safety-manager-operating mode, the parameter-detecting module 25 may then read out the subscribers-specific parameters from the parameter memories 3 of the safety-relevant subscribers. Moreover, the configuration-detecting module 24 may detect the data and process-specific configuration directly from the configuration of the connected automation network and/or from the control program of the safety master.

By means of the safety manager according to the invention and/or the safety-step-calculation method according to the invention it is possible to automatically determine the safety step in the automation network in a simple manner, particularly after modifications have been carried out in the automation network, e.g. after connecting a further safety-relevant subscriber.

In order to determine a safety step in an automation network comprising subscribers, according to the invention the data and process-specific links between the subscribers in the automation network and the subscriber-specific safety parameters are detected automatically. The safety step in the automation network is then calculated by means of an algorithm connecting the detected data and process-specific links of the subscribers in the automation network and the detected subscriber-specific safety parameters. According to the invention, the process is thereby executed on a safety manager comprising a configuration-detecting module for detecting the data and process-specific link of the subscribers in the automation network and a parameter-detecting module for detecting subscriber-specific safety parameters, as well as a calculation module for carrying out the algorithm.

The inventive procedure for determining a safety step in an automation network and/or the associated safety manager allow for automatic calculation of the safety step. Particularly, it is no longer necessary for the operator to analyze the structure of the automation network and enter it into the calculation module. Moreover, the inventive procedure and the correspondingly configured safety manager allow for automatically detecting expansions or modifications in the automation network and taking these into account when calculating the safety step.

According to an embodiment, the subscriber-specific safety parameters are stored in the respective subscribers and are automatically retrieved by the safety manager in order to calculate the safety step via an automation network connection of the subscribers. By storing the subscriber-specific safety parameters directly in the subscribers and by retrieving them online, it is no longer necessary to carry out time-consuming up-dates of the software library. The calculation module in the safety manager obtains the subscriber-specific safety parameters directly from the subscribers so that new and/or so far unknown subscribers may be involved in a simple manner, as well. Thus, it is guaranteed that modifications and expansions of the safety function or an exchange of subscribers in the automation network is reliably taken into account during the determining of the safety step.

According to an further embodiment, the data and process-relevant links between the subscribers from the predetermined configuration of the automation network are determined in order to carry out an automation task. The configuration of the control logic for carrying out the automation task comprises all necessary data and process-specific links which have to be taken into account when calculating the safety step. The data and process-specific links may thus be determined on the basis of the control hardware in a simple manner.

In order to detect the data and process-specific links between the subscribers, the logic links of inputs and outputs of the subscribers are preferably detected in order to carry out the automation task. This information comprises all necessary data in order to be able to fully take into account the data and process-specific links of the subscribers during the calculation of the safety step.

While the foregoing is directed to embodiments of the invention, other and further embodiments of this invention may be devised without departing from the basic scope of the invention, the scope of the present invention being determined by the claims that follow.

The invention claimed is:

1. A method for determining a safety-relevant capacity within a safety-relevant standard in an automation network with non-safety-relevant subscribers and safety-relevant subscribers, the method comprising:
   operating the automation network, wherein the subscribers comprise a control layer and a plurality of distributed devices arranged in a sensor/actuator layer to carry out an automation task, the safety-relevant standard defining safety steps for categorizing differing safety-relevant capacities of the safety-relevant subscribers and the safety steps representing differing average probability values for a dangerous failure of one of the safety-relevant subscribers in the automation network per hour while carrying out the automation task;

automatically determining data and process-specific links between the safety-relevant subscribers in the automation network by a configuration-detecting module, the data and process-specific links being logic links of inputs and outputs of the safety-relevant subscribers configured within a control logic for carrying out the automation task, detected by the configuration detecting module while the automation task is executed;

determining subscriber-specific safety parameters to calculate the safety steps; and calculating the safety-relevant capacity within the safety-relevant standard in the automation network by an algorithm which connects the determined data and process-specific links of the subscribers in the automation network and the automatically determined subscriber-specific safety parameters, wherein the safety steps are determined.

2. The method according to claim 1, wherein the algorithm takes the safety-relevant standard into account such that the safety-relevant standard categorizes the safety-relevant capacities of the safety-relevant subscribers.

3. The method according to claim 1, wherein the subscriber-specific safety parameters are determined automatically by a parameter-detecting module to automatically take modifications in the automation network into account when calculating the safety steps.

4. The method according to claim 3, wherein the subscriber-specific safety parameters are stored in the respective subscriber and automatically retrieved by the parameter-detecting module such that new or unknown subscribers are included when calculating the safety steps.

5. The method according to claim 1, further comprising switching the automation network off or to a safe state if one of the safety-relevant subscribers fails.

6. A non-transitory computer readable data storage medium with program code executable on a computer processor to perform the method according to claim 1.

7. A hardware safety manager for an automation network with non-safety-relevant subscribers and safety-relevant subscribers forming a control layer and a plurality of distributed devices arranged in a sensor/actuator layer to carry out an automation task, the safety manager comprising:

a configuration-detecting module for automatically detecting data and process-specific links between the safety-relevant subscribers in the automation network from an automation network configuration, the data and process-specific links being logic links of inputs and outputs of the safety-relevant subscribers configured within a control logic for carrying out the automation task, detected by the configuration detecting module while the automation task is executed, a parameter-detecting module for automatically detecting subscriber-specific safety parameters to calculate the safety steps, and a calculation module for calculating a safety-relevant capacity within a safety-relevant standard by an algorithm which connects the data and process-specific links of the subscribers in the automation network to the subscriber-specific safety parameters, wherein the safety steps are determined, the safety-relevant standard defining safety steps for categorizing differing safety-relevant capacities of the safety-relevant subscribers and the safety steps representing differing average probability values for a dangerous failure of one of the safety-relevant subscribers in the automation network per hour while carrying out the automation task.

8. The safety manager according to claim 7, wherein the algorithm takes the safety-relevant standard into account such that the safety-relevant standard categorizes the safety-relevant capacities of the safety-relevant subscribers.

9. The safety manager according to claim 7, whereby the parameter-detecting module automatically detects the subscriber-specific safety parameters to automatically take modifications in the automation network into account when calculating the safety steps.

10. The safety manager according to claim 7, wherein the safety manager is configured to switch the automation network off or to a safe state if one of the safety-relevant subscribers fails.

11. An automation network comprising:

a safety manager and a plurality of subscribers comprising a control layer and a plurality of distributed devices arranged in a sensor/actuator layer to carry out an automation task, wherein the safety manager comprises a configuration-detecting module for automatically detecting data and process-specific links of the subscribers in the automation network from an automation network configuration, said data and process-specific links of the subscribers being logic links of inputs and outputs in the subscribers configured within a control logic for executing the automation task, said automation network configuration being converted into a system model representing the data and process-specific links of the safety-relevant subscribers in the control logic of the automation network, the system model automatically detected in a test mode while the automation task is executed, and wherein each subscriber comprises a parameter memory in which assigned subscriber-specific safety parameters are stored, the subscribers being configured to transfer the safety parameters to a parameter-detecting module upon request.

12. The automation network according to claim 11, wherein the safety manager further comprises:

the parameter-detecting module being configured for automatically detecting the subscriber-specific safety parameters, and a calculation module for calculating a safety-relevant capacity of the subscribers within a safety-relevant standard by an algorithm which connects the data and process-specific links of the subscribers in the automation network to the subscriber-specific safety parameters, the safety-relevant standard defining safety steps for categorizing differing safety-relevant capacities of safety-relevant subscribers in the automation network, the safety steps representing differing average probability values for a dangerous failure of one of the safety-relevant subscribers in the automation network per hour while carrying out the automation task;

wherein the subscriber-specific safety parameters are automatically retrieved from the respective subscribers to calculate the safety steps.

13. The automation network according to claim 12, wherein the algorithm takes the safety-relevant standard into account such that the safety-relevant standard categorizes the safety-relevant capacities.

14. The automation network according to claim 12, wherein the parameter-detecting module of the safety manager automatically detects the subscriber-specific safety parameters to automatically take modifications in the automation network into account when calculating the safety steps.

15. The automation network according to claim 12, wherein the safety manager is configured to switch the automation network off or to a safe state if one of the safety-relevant subscribers fails.

* * * * *

UNITED STATES PATENT AND TRADEMARK OFFICE
CERTIFICATE OF CORRECTION

PATENT NO. : 9,665,072 B2
APPLICATION NO. : 13/113397
DATED : May 30, 2017
INVENTOR(S) : Jens Sachs and Guido Beckmann It is certified that error appears in the above-identified patent and that said Letters Patent is hereby corrected as shown below:

In the Specification

At Column 1, Line 8:
"filed on No. 18, 2009"
Should read:
--filed on Nov. 18, 2009--

At Column 1, Line 61:
"the EN ISO3849-1"
Should read:
--the EN ISO13849-1--

At Column 2, Lines 8-9:
"the EN 15013849-1"
Should read:
--the EN ISO13849-1--

Signed and Sealed this
Second Day of January, 2018

Joseph Matal
*Performing the Functions and Duties of the
Under Secretary of Commerce for Intellectual Property and
Director of the United States Patent and Trademark Office*